United States Patent [19]

Terrier

[11] Patent Number: 5,664,415
[45] Date of Patent: Sep. 9, 1997

[54] AFTER-BURNING TURBO-FAN ENGINE WITH A FIXED GEOMETRY EXHAUST NOZZLE HAVING A VARIABLE FLOW COEFFICIENT

[75] Inventor: Douglas A. Terrier, Fort Worth, Tex.

[73] Assignee: Lockheed Fort Worth Company, Fort Worth, Tex.

[21] Appl. No.: 252,191

[22] Filed: Jun. 1, 1994

[51] Int. Cl.$^6$ ........................................ F02K 1/28
[52] U.S. Cl. ................... 60/204; 60/231; 60/242; 60/261
[58] Field of Search ............... 60/204, 231, 261, 60/242, 262, 226.1; 239/265.17, 265.23

[56] References Cited

U.S. PATENT DOCUMENTS

| | | |
|---|---|---|
| 2,625,008 | 1/1953 | Crook . |
| 2,943,821 | 7/1960 | Wetherbee, Jr. ................ 601/231 |
| 2,952,123 | 9/1960 | Rich ................................ 60/231 |
| 3,279,192 | 10/1966 | Hull, Jr. et al. . |
| 3,390,529 | 7/1968 | Pel et al. . |
| 3,410,093 | 11/1968 | Ghougasian . |
| 3,742,711 | 7/1973 | Timms . |
| 4,446,695 | 5/1984 | Burtis . |
| 4,606,499 | 8/1986 | Langley, Jr. . |
| 4,947,644 | 8/1990 | Hermant . |
| 5,074,118 | 12/1991 | Kepler . |
| 5,103,639 | 4/1992 | Wolf .............................. 60/271 |
| 5,222,361 | 6/1993 | Nelson et al. ................. 60/269 |

Primary Examiner—Timothy Thorpe
Attorney, Agent, or Firm—Baker & Botts, L.L.P.

[57] ABSTRACT

An after-burning turbo-fan engine system (10) includes turbo-fan engine (14) for producing exhaust gas (20), and jet thrust therefrom. After-burning chamber (16) receives turbo-fan exhaust and injects a controllable amount of fuel into turbo-fan exhaust to cause after burning of the turbo-fan exhaust to produce after-burned exhaust (20). Nozzle (18) associates with after-burning chamber (16) for receiving after-burned exhaust (20). Nozzle (18) has a fixed geometry. Nozzle (18) flow coefficient control mechanism (22 and 24) controls the approach of after-burned exhaust (20) through nozzle (18) to change the nozzle (18) flow coefficient. This controls the volumetric flow rate of after-burned exhaust (20) through the nozzle (18).

18 Claims, 3 Drawing Sheets

AFTER-BURNING TURBO-FAN ENGINE WITH A FIXED GEOMETRY EXHAUST NOZZLE HAVING A VARIABLE FLOW COEFFICIENT

TECHNICAL FIELD OF THE INVENTION

This invention relates in general to the field of turbo-fan engines, and more particularly, to a fixed geometry exhaust nozzle having a variable flow coefficient for a turbo-fan engine with after-burning capability.

BACKGROUND OF THE INVENTION

In order to meet the thrust requirements of military applications, military turbo-fan engines employ after-burning. During after-burning, fuel is added and ignited in the exhaust of a turbo-fan engine to create additional thrust. A consequence of after-burning is that when the exhaust burns, it becomes less dense and requires opening the turbo-fan engine exhaust nozzle to maintain air flow rate at a level that is acceptable for proper engine operation. An insufficient exhaust nozzle area limits this air flow rate to create back-pressure on the fan. This back-pressure can cause the engine to stall. One approach to preventing engine stall during after-burning is to use a adjustable exhaust area nozzle that permits control of the cross-sectional nozzle exhaust flow area during after-burning. This allows the exhaust that the engine burns to escape more easily from the turbo-fan engine. As a result, the back pressure subsides. The opening and closing of the adjustable exhaust area nozzle has the appearance of an eye iris as the eye reacts to changes in light intensity.

Using an engine with an adjustable exhaust nozzle, however, has many inherent disadvantages which penalize aircraft performance. Some of the disadvantages relate to the mechanical aspects of the engine nozzle. The adjustable exhaust nozzle has greater mechanical complexity, greater weight, and greater fabrication and operation costs does than an engine not having such a nozzle. At the same time, such nozzles offer poor reliability and maintainability, integrate poorly into the aerodynamic contours of the air frame and have edges and gaps that increase the aircraft's radar signature. In addition, the moveable surfaces of such nozzles are difficult to cool. This makes reducing the infrared signature of the aircraft either impossible or impractical.

The radar and infrared signature disadvantages of the adjustable exhaust area nozzle prevent using engines with after-burning capability in some military applications, such as those aircraft designed to have low radar and thermal signatures. Currently available military aircraft that incorporate into their airframe some form of stealth protection all must have fixed geometry nozzles. Because these nozzles must be fixed, there is no after-burning capability for these aircraft. The lack of after-burning capability prevents these aircraft from using the additional thrust that after-burning would make available. As a result, incorporating the additional stealth characteristics into the airframe comes at the cost of additional vulnerability to the crew from their not having the additional thrust that after-burning provides.

One attempt to eliminate the inherent disadvantages of an adjustable exhaust area nozzle is to use a fixed aperture nozzle at the after-burning engine exhaust while varying the internal flow area of the exhaust nozzle. An inherent problem with this approach is that maintaining the exit aperture fixed produces a non-optimum area ratio in the nozzle. The non-optimum area ratio, therefore, causes a loss of engine thrust.

A need exists, therefore, for a turbo-fan engine with after-burning capabilities that overcomes back-pressure problems of existing fixed nozzle configurations, and that avoids the limitations of known adjustable exhaust area nozzles.

A need exists for an improved after-burning turbo-fan engine that is mechanically simple, lightweight, and inexpensive relative to the adjustable exhaust area nozzle configurations.

There is a further need for a turbo-fan engine having a fixed geometry exhaust nozzle that possesses high reliability and maintainability and that does not adversely affect integration of the nozzle into the airframe or produce undesirable radar and infrared signatures from the nozzle.

SUMMARY OF THE INVENTION

The present invention, accordingly provides an after-burning turbo-fan engine having a fixed nozzle that substantially eliminates or reduces disadvantages and problems associated with prior art after-burning turbo-fan engines that use adjustable exhaust area nozzles.

According to one aspect of the invention there is provided an after-burning turbo-fan engine system that includes a turbo-fan engine for providing turbo-fan exhaust and turbo-fan power therefrom. An after-burning chamber within the system receives the turbo-fan exhaust and injects a controllable amount of fuel into the turbo-fan exhaust to cause after-burning of the turbo-fan exhaust that produces additional thrust from the engine. A nozzle associated with the after-burning chamber has a fixed geometry and receives the after-burned exhaust. A nozzle coefficient control mechanism controls the approach of the after-burned exhaust through the after-burning chamber and the nozzle to change the flow coefficient of the nozzle and, thereby, control the volumetric flow rate of the after-burning exhaust through the nozzle.

Several embodiments of the nozzle coefficient control mechanism are within the scope of the present invention. They include, for example, a pneumatic control device that directs compressed air in the path of the after-burned exhaust. This controls the nozzle flow coefficient and effectively controls the volumetric flow rate of the after-burning exhaust through the nozzle. Other types of nozzle coefficients control mechanisms may include, for example, the use of a mechanical shield to change the flow approach to the nozzle, an inflatable diaphragm for changing the approach chamber to the nozzle, as well as various combinations of these and other types of approach-varying nozzle coefficient control mechanisms that control after-burner exhaust flow at the nozzle entrance.

Technical advantages of the present invention over previous variable nozzle after-burning turbo-fan engines include reduced weight of the fixed geometry exhaust nozzle engine over that of an engine with a variable-geometry nozzle. The fixed geometry nozzle does not require any moving parts and, therefore, eliminates all hinges, seals, actuators, hydraulics and other mechanical items necessary to open and close a variable nozzle of the adjustable exhaust nozzle. As a result, as much as a twenty- to thirty-percent weight reduction in the turbo-fan engine results.

Another technical advantage of the present invention is the reduced nozzle costs per engine. A variable-geometry nozzle for a military turbo-fan engine will typically cost approximately $350,000 per nozzle in 1994 dollars. It is estimated that nozzle costs in the engine of the present invention, to the contrary, will be less than half the costs of variable-geometry nozzle.

Another technical advantage of the present invention is the reduced complexity of the turbo-fan engine due to the elimination of the parts necessary to open and close the variable-geometry nozzle. Reducing the complexity of the engine improves the reliability and maintainability of the engine. This reduction allows obtaining higher reliability and less frequent and complex engine maintenance than that associated with a variable-geometry nozzle.

Another technical advantage of the engine of the present invention is improved integration of the engine into the airframe of the aircraft. The fixed geometry nozzle of the present invention blends well with the aircraft contours and leaves no corners or gaps showing. As a result, it is possible to easily and effectively reduce both the radar and infrared signatures of an aircraft while producing the flow control that heretofore has been possible only through a variable-geometry nozzle.

Another technical advantage of the present invention is reduced leakage of the exhaust through the nozzle. An engine with a variable nozzle has gaps and cracks that are necessary to accommodate moving the parts of the nozzle. Air simply leaks out of those gaps and cracks rather than being exhausted axially from the engine for thrust. This reduces the overall performance of the engine. The engine of the present invention, on the other hand, eliminates the gaps and cracks in the nozzle and, consequently, improves the overall performance of the associated engine.

BRIEF DESCRIPTION OF THE DRAWINGS

For a more complete understanding of the present invention and the advantages thereof, reference is now made to the following description which is to be taken in conjunction with the accompanying drawings wherein like reference numerals indicate like features, and further wherein.

DETAILED DESCRIPTION OF THE INVENTION

The preferred embodiment of the present invention is illustrated in the various Figures, wherein like numerals are used for like and corresponding parts of the various drawings.

High performance military aircraft use after-burning engines to provide high specific thrust. Operation of conventional after-burning engines requires an adjustable exhaust area nozzle. The adjustable exhaust area nozzles are generally costly, heavy, and adversely affect aircraft signatures as well as their general reliability, maintainability and sustainability. All of these problems derive from the mechanical complexity of the adjustable exhaust area nozzle. There is, therefore, a need for improvement in after-burning engine nozzles. Recent government studies have attempted to develop mechanically simple nozzles that are light in weight, low in cost, have minimal radar and infrared signatures. These studies also tried to develop such nozzles with high reliability, maintainability and sustainability while providing after-burning capability. There is no known way, however, to provide the benefits of fixed after-burning nozzles with fixed cycle engines. In fact, no known turbo-fan engine system combines the benefits of after-burning thrust together with a mechanically simple nozzle.

The present embodiment, to the contrary, controls the effective nozzle area by manipulating the sub-sonic approach flow field and, thereby, changing the nozzle discharge flow coefficient. The fixed-geometry nozzle of the present embodiment varies the nozzle throat geometry to adjust the nozzle flow coefficient. The preferred embodiment uses a fluidic effector, for example, to change the throat approach from an orifice having a sharp or steep approach to an aerodynamically smooth approach that offers a high discharge coefficient. The fluidic effector of the present embodiment responds to the injection of fluid to control the nozzle effective flow area. An alternative embodiment uses a deployable surface in the exhaust throat to change the flow approach to the nozzle. This mechanical embodiment, therefore, also changes the nozzle effective area. The resulting change in nozzle effective area controls the nozzle flow without the complex mechanical configurations of the known adjustable exhaust area nozzles. As a result, the present invention controls the flow of after-burned exhaust, while permitting specific improvements in the integrated aircraft system. Specific improvements include lower cost, less weight, and greater structural and aerodynamic integration, reduced infrared and radar cross-sections, the potential use of special cooling and treatments.

Figure 1:
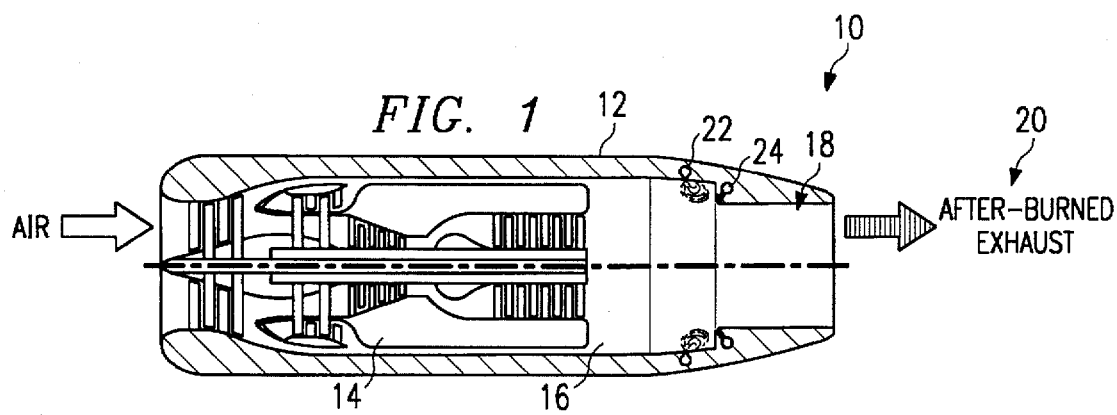
FIG. 1 provides a simplified cross-section of the after-burning turbo-fan engine of the present embodiment.

To describe the present embodiment, reference is now made to FIG. 1, there appears after-burning turbo-fan engine 10 which includes jet casing 12 in which resides turbo-fan engine 14. Turbo-fan engine 14 exhausts into after-burning chamber 16. After-burning chamber 16 contains turbo-fan exhaust from turbo-fan engine 14. In after-burning chamber 16, the turbo-fan exhaust receives additional fuel in a controlled way and exhausts through nozzle 18 in the form of after-burned exhaust 20. Of particular interest in the after-burning turbo-fan engine 10 are injectors 22 and 24 that exhaust in nozzle approach and throat area 26 to produce a change in the approach of after-burned exhaust 20 through nozzle 18.

Figure 2:
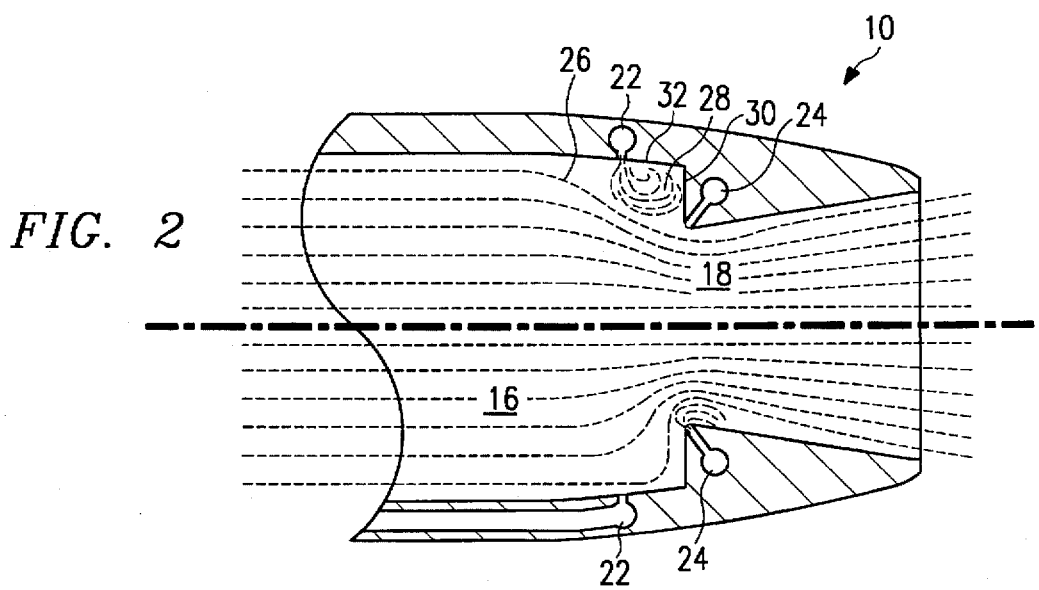
FIG. 2 illustrates the nozzle coefficient control mechanism of one embodiment of the present invention.

FIG. 2 shows in more detail the flow of after-burned exhaust 20 through nozzle 18. In particular, injectors 22 and 24 control the discharge coefficient of nozzle 18. Injectors 22 form an annulus ring about after-burning chamber 16 to produce a control region 28 within nozzle approach area 26 which after-burned exhaust 20 does not enter. This prevents after-burned exhaust 20 from impacting wall 30 of after-burning chamber 16. As a result, the path of flow for after-burned exhaust 20 through after-burning chamber 16 is smooth. That is, the discharge coefficient is higher than in the case when after-burned exhaust 20 directly impacts wall 30. This higher discharge coefficient case occurs when no air flows through injectors 22. As a result, the effective flow through nozzle 18 of after-burning exhaust 20 is greater when compressed air or inert gas is injected than in the absence of compressed air from injectors 22.

Injectors 24 further affect the discharge coefficient of nozzle 18. That is, as compressed air flows through injectors 24, the opening of nozzle 18 effectively constricts. This restricts the flow of after-burned exhaust 20 through nozzle 18 to change the discharge coefficient from after-burning chamber 16. This changes the effective area of nozzle 18 so that there is less after-burned exhaust flow through nozzle 18.

Other embodiments for changing the discharge coefficient of nozzle 18 as after-burning exhaust 20 passes through after-burning chamber may include, for example, the installation of a diaphragm that covers a portion of the area of nozzle 18 and that may be filled with compressed air or a liquid to change the approach that after-burned exhaust 20 makes to nozzle 18. Alternatively, a mechanical control in the form of a deployable surface that directs flow into nozzle 18 may be used. Such a surface may mechanically attach to wall 30 or wall 32 for deployment. The surface changes the discharge coefficient and, therefore, the effective area nozzle 18 and flow of after-burned exhaust 20.

Figure 3:
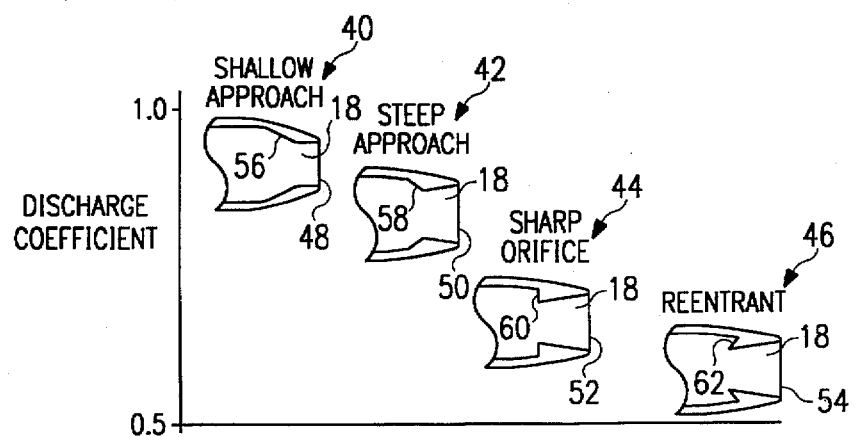
FIG. 3 shows the various approach paths that the present embodiment can establish within the after-burning chamber of the turbo-fan engine.

In FIG. 3 appears a chart that describes the effect that the nozzle 18 approach has on the discharge coefficient. For example, FIG. 3 shows a variety of approach configurations including shallow approach configuration 40, steep approach configuration 42, sharp orifice configuration 44 and reentrant configuration 46. Along the vertical axis of the FIG. 3 chart appears a range of discharge coefficients from 0.5 to 1.0. A discharge coefficient of 1.0 indicates that a minimum amount of resistance exists as the after-burned exhaust enters the orifice. This can be seen by shallow approach 40 which has a higher discharge coefficient than does steep approach 42. FIG. 3 depicts this relationship by placing shallow approach configuration 40 above steep approach configuration 42. Likewise, steep approach configuration 42 has a higher discharge coefficient than does sharp orifice configuration 44. Moreover, sharp orifice configuration 44 has a higher discharge coefficient than does reentrant configuration 46.

Each of the configurations of FIG. 3 has its name due to the associated approach of flow through nozzle 18. For example, shallow approach configuration 40 has a shallow approach as indicated by wall 56 being more flat than is the case with the other configurations. Steep approach configuration 42 has wall 58 which has a greater angle than does wall 56 of shallow approach 40, but not as sharp or steep as wall 60 of sharp orifice configuration 44. Furthermore, reentrant configuration wall 62 takes an angle in the direction opposite of flow of exhaust as it passes through nozzle 18. Also, in each configuration the physical size of the nozzle 18 orifice is constant. That is, nozzle exit 48 has the same area as does (1) nozzle exit 50 of steep approach configuration 42; (2) nozzle exit 52 of sharp orifice configuration 44; and (3) nozzle exit 54 of reentrant configuration 46. Each configuration permits flow, however, through its associated orifice to a degree that is different from that of the other configurations. Therefore, for example, shallow approach configuration 40 permits more flow through its nozzle exit 48 than reentrant configuration 46 permits through its nozzle exit 54. It is important in understanding the present embodiment that the various flow approaches that FIG. 3 describes are the result of varying the flow of control gases through injectors 22 and 24. It is tis variation that makes possible adjustment of the nozzle 18 flow coefficient.

Figure 4:
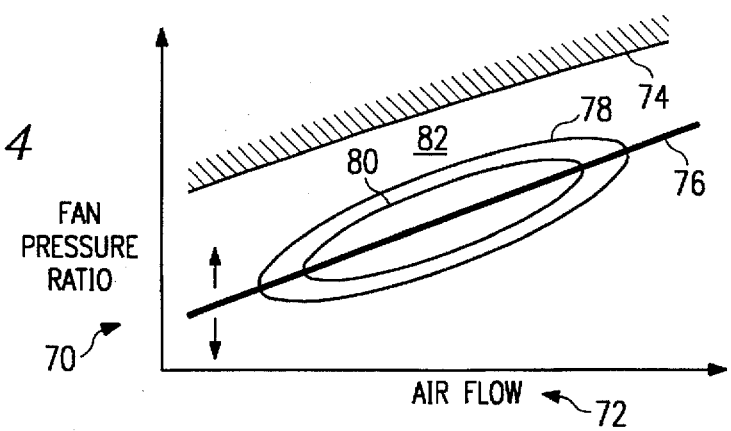
FIG. 4 shows an operating curve for a turbo-fan engine that operates with the present embodiment.

FIG. 4 shows the relationship between the pressure ratio within turbo-fan engine 10 and the air flow through nozzle 18. In particular, the chart of FIG. 4 shows along vertical axis 70 the fan pressure ratio and along the horizontal axis 72 the air flow for turbo-fan engine 10. Stall line 74 indicates a line of fan pressure ratio and air flow values at which turbo-fan engine 10 stalls. Operating line 76 indicates the ideal operating line for turbo-fan engine 10. The area between stall line 74 and operating line 76 may be termed the "stall margin," as reference numeral 82 indicates. Concentric ellipses 78 and 80 show different fan efficiency envelopes for turbo-fan engine 10. It is an object of the present embodiment to maintain operating line 76 constant throughout after-burning and non-after-burning operation of turbo-fan engine 10. Thus, as exhaust 20 passes through turbo-fan engine system 10 of the present embodiment, it is optimal that the fan pressure ratio and air flow fall along line 76.

Note that as air flow decreases for a given amount of fan pressure in turbo-fan engine 10 exhaust, turbo-fan 10 operation moves in the direction of stall line 74, or, equivalently, stall margin 82 reduces. This condition occurs if the afterburner is engaged without an accompanying increase in nozzle effective area. To offset the reduction in stall margin 82, it is desirable to increase the effective flow area of the nozzle 18 to maintain operating line 76. Thus, by increasing the nozzle 18 effective area, it is possible to maintain the stall margin 82 constant for changing conditions. This can be done in a programmed or scheduled way. Scheduling allows turbo-fan engine 10 to achieve the thrust available with after-burning, while maintaining operating line 76.

Figure 5:
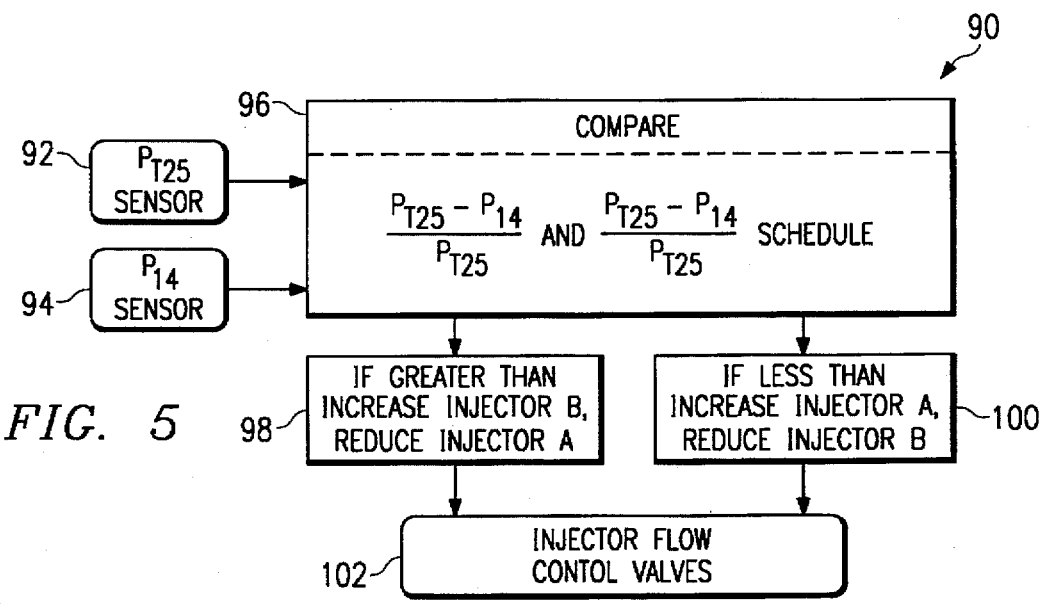
FIG. 5 illustrates a method for controlling the after-burning turbo-fan engine of the present embodiment.

FIG. 5 shows a flow diagram 90 of one embodiment of a controller to cause engine conditions to follow operating line 76 of FIG. 4. The necessary sensing circuitry and program control circuitry can be implemented in a variety of ways. The operation of a control program is as follows. The program that flow diagram 90 describes maintains the operating line 76 of turbo-fan engine 10 throughout the thrust stage, including during after-burning. In step 92, a sensor monitors the total pressure in the engine fan stream. In step 94, another sensor monitors fan stream static pressure. Step 96 depicts the comparison of a ratio based on sensed pressure to a ratio based on a scheduled pressure. The sensed ratio is the following:

$$R_s = P \frac{(P_{T25} - P_{14})}{P_{T25}} \quad (1)$$

where $P_{T25}$ represents the total pressure in the fan stream and $P_{14}$ represents the static pressure of the fan stream. The ratio $R_s$ is compared to a scheduled parameter $R_{Sched}$ which is the scheduled ratio having the value $$R_{Sched} = \frac{(P_{T25_{schedule}} - P_{14_{schedule}})}{P_{T25_{schedule}}} \quad (2)$$

If $R_s$ is different from $S_{Sc}$, the controller of the present embodiment goes to one of steps 98 and 100. If the $R_s$ is greater than $R_{Sched}$, then the present embodiment changes the nozzle coefficient by increasing the air flow through injectors 22 and decreasing the air flow through injectors 24. Conversely, if the pressure ratio is less than the scheduled ratio, then flow through injectors 22 increase and flow through injector 24 decreases. Thus, the signals from steps 98 and 100 go to step 102 by which control signals go to the control valves (not shown) for injectors 22 and 24 to change the nozzle discharge coefficient for nozzle 18.

Figure 6:
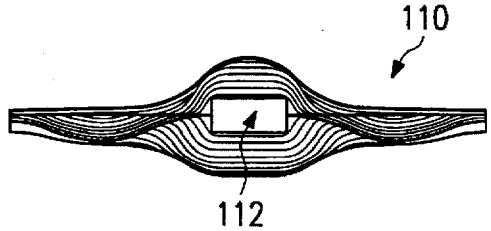
FIGS. 6 and 7 show, respectively, a rear view and a top view of an integrated airframe using the present invention.
Figure 7:
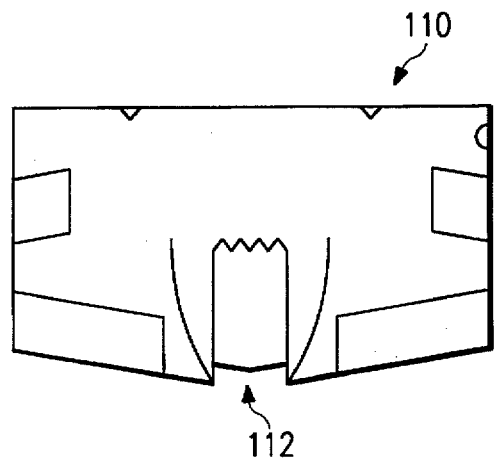
Figure 9:
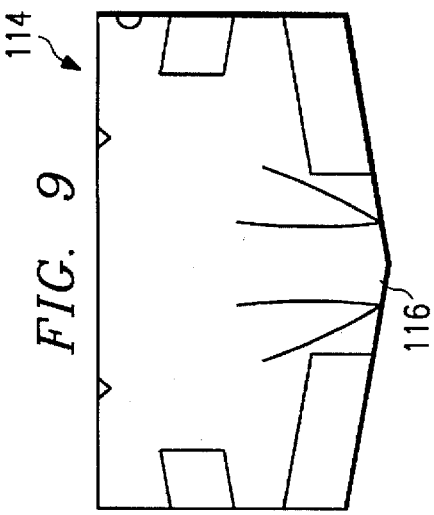
FIGS. 8 and 9 illustrate, respectively, a rear view and a top view of an alternative airframe embodiment incorporating the concepts of the present invention.
Figure 8:
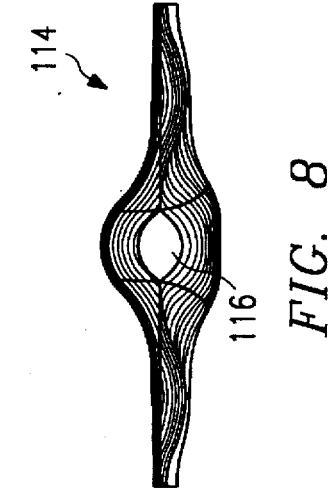

FIGS. 6 through 9 depict integration options available using the fixed geometry nozzle of the present embodiment. FIG. 6, for example, is a rear view of high-speed airframe 110 that incorporates a conventional rectangular variable nozzle 112. FIG. 7 shows a top down portion of high-speed airframe 110 of FIG. 6 further showing variable geometry nozzle 112. As is clear in FIGS. 6 and 7, the integration of turbo-fan engine variable geometry nozzle 112 requires significant changes in the aircraft contour. FIGS. 8 and 9 show, respectively, rear and top down views of airframe 114 as another option that the present embodiment makes possible. The present embodiment permits integrating turbo-fan engine fixed geometry nozzle 116 within the existing structure of aircraft airframe 114, and with the external contours of the aircraft to permit improved aerodynamics and radar signatures.

Figure 10:
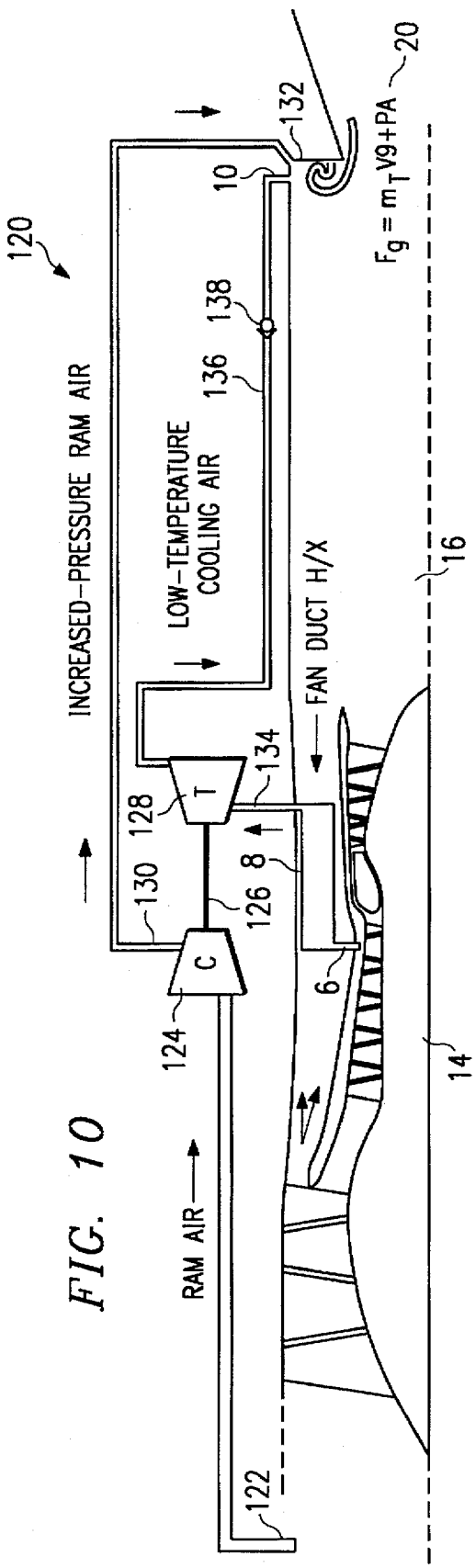
FIG. 10 shows a further exemplary implementation of certain inventive concepts for supplying cool, high pressure to the control system of the present embodiment.

FIG. 10 illustrates system 120 for supplying cool, high pressure gas into after-burning chamber 16. Referring to FIG. 10, ram air intake line 122 receives ram air from engine 14 and directs this air to compressor 124. Compressor 124 connects through connection 126 to turbine 128. Increased-pressure ram air line 130 also connects to compressor 124 to receive compressed ram air and direct the compressed ram air to nozzle 24. Turbine 128 receives compressed air from bleed port 134 after the air passes through heat exchanger 136. Air from turbine 128 flows through low-temperature cooling air line 138, past check valve 140 to nozzle 22.

In FIG. 10, therefore, a turbo cooler 34 provides nozzle 18 control and cooling air. Compressed air bleed from compressor bleed port 139 turbine 128 drives after passing through a heat exchanger 136 of engine 14. Heat exchanger 136 cools the bleed air. As the air expands in the turbine 128, it does work and, thereby, extracts heat from the bleed air. This lowers the bleed air temperature. The cooler air is then admitted in the nozzle 22 to provide flow control and to cool the adjacent nozzle walls to produce a reduced infrared signature. Turbine 128 connects via shaft 126 to compressor 124 which compresses air taken from outside engine 10. It can then be used in the nozzle 24 to provide further flow control. This air, however, unlike the turbine 128 exit air, is unsuitable for cooling purposes. The combination of this turbine 128 with compressor 124 and the fluidic nozzle provides a source for the nozzle 22 cooling air and also synergistically accomplishes nozzle 22 cooling.

Technical advantages of the present embodiment over previous variable nozzle after-burning turbo-fan engines include reduced weight of the fixed geometry exhaust nozzle engine over that of an engine with a variable-geometry nozzle. The fixed geometry nozzle does not require any moving parts and, therefore, eliminates all hinges, seals, actuators, hydraulics and other mechanical items necessary to open and close a variable nozzle of the adjustable exhaust nozzle. As a result, as much as a twenty- to thirty-percent weight reduction in the turbo-fan engine results.

Another technical advantage of the present embodiment is the reduced nozzle costs per engine. An engine with a variable-geometry nozzle and a military turbo-fan engine will typically cost approximately $350,000 per nozzle. It is estimated that nozzle costs in the engine of the present embodiment, to the contrary, will be less than half the costs of variable-geometry nozzle.

Another technical advantage of the present embodiment is the reduced complexity of the turbo-fan engine due to the elimination of the parts necessary to open and close the iris of an engine with the variable-geometry exhaust nozzle. Reducing the complexity of the engine improves the reliability and maintainability of the engine. This reduction allows obtaining higher reliability and less frequent and detailed engine maintenance than is possible with a variable-geometry nozzle.

Another technical advantage of the engine of the present embodiment is improved integration of the engine into the airframe of the aircraft. The fixed geometry nozzle of the present embodiment blends well with the aircraft contours and leaves no corners or gaps showing. As a result, it is possible to easily and effectively reduce both the radar and infrared signatures of an aircraft while producing the variable flow that heretofore has been possible only through a variable-geometry nozzle.

Yet another technical advantage of the present embodiment is reduced leakage of the exhaust through the nozzle. An engine with a variable nozzle has gaps and cracks that are necessary to accommodate moving the parts of the nozzle. Air simply leaks out of those gaps and cracks rather than being exhausted axially from the engine for thrust. This reduces the overall performance of the engine. The engine of the present embodiment, on the other hand, eliminates the gaps and cracks in the nozzle and, consequently, improves the overall performance of the associated engine.

OPERATION

Although from the above description operation of the present embodiment is clear, for completeness the following describes an exemplary operation of the after-burning fixed geometry turbo-fan engine system Suppose, for example, that the pilot of an aircraft incorporating the present embodiment initially operates the plane at a reduced power setting with no after-burning. In the event that the pilot operates the throttle to increase the speed of the aircraft, an increased exhaust level results. As the pilot advances the throttle, turbo-fan engine system 10 produces more flow. If the pilot seeks to accelerate to the point that after-burning is necessary, fuel as is added in the after-burning chamber 16. In order to prevent stalling of the engine, that is to keep engine operation within stall margin 82, it is necessary to increase the effective flow area of nozzle 18. To accomplish this, the present embodiment, assuming injectors 24 are operating, would decrease flow of compressed air through injector 24, while increasing flow of compressed air through ejector 22 to produce an aerodynamically smooth path for the after-burn exhaust to exit nozzle 18. By eliminating the effect of sharp wall 30, and allowing flow to totally fill the effected geometric area of nozzle 18, it is possible to effectively change the throat area of nozzle 18 that is necessary for after-burning operation. This is done, while at the same time, maintaining turbo-fan engine system 10 operation along operating line 76.

In essence, therefore, the present embodiment allows turbo-fan engine 10 to maintain operation along operating line 76 both during after-burning and during normal operation. The amount of flow entering the front of the engine is constant. The gas generator, the fan, the components of the engine itself are operating at the same conditions during after-burning. Nothing changes during after-burning except that the volume of the air increases as the density decreases. At the back of the engine there is a certain volume of air at a certain temperature that continues downstream through nozzle 18. This requires some back pressure on the fans which the engine can support. It requires a given nozzle effective area. When you inject the additional air in after-burning chamber (i.e., augmenter 16) downstream of the engine and light that off, higher temperatures occur. As the volume flow increases, even though it is the same amount of mass flow, it expands and its volume increases because it is at higher temperature. In order for the air to continue through nozzle 18, the hole in the nozzle physically has to be larger because the air is less dense. Without opening nozzle 18, the effect would be that additional after-burning would actually create back pressure in the engine and tend to stall those components.

Accordingly, the present embodiment provides a method and system to vary the effective flow area of nozzle 18 without any mechanical changes in the nozzle geometry. The present embodiment accomplishes this result by altering the upstream subsonic aerodynamic profile approaching the throat through the use of, in at least one embodiment, fluidic injection that alters the flow field so that the flow effectively sees anywhere from a nice shallow approach where injector A provides a cushion of air simulating a smooth wall at the exit portion of augmenter 16 all the way to a sharp approach geometry when injector 22 is not operating that provides a low discharge coefficient. In further summary, the present embodiment provides an after-burning turbo-fan engine system that includes a turbo-fan engine for producing a turbo-fan exhaust in turbo-fan power therefrom. An after-burning augmenter receives the turbo-fan exhaust and injects a controllable amount of fuel into the turbo-fan exhaust to cause after-burning of the turbo-fan exhaust to produce after-burned exhaust. A nozzle associates with the after-burning augmenter for receiving the after-burned exhaust. The nozzle has a fixed geometry. The present embodiment further includes a nozzle coefficient control mechanism that controls the approach of the after-burned exhaust through the nozzle to change the nozzle coefficient of the nozzle and thereby control the volumetric flow rate of the after-burned exhaust through the nozzle.

Although the invention has been described with reference to the above-specified embodiments, this description i's not meant to be construed in a limiting sense. Various modifications of the disclosed embodiment, as well as alternative embodiments of the invention will become apparent to persons skilled in the art upon reference to the above description. It is therefore, contemplated that the appended claims will cover such modifications that fall within the true scope of the invention.

What is claimed is:

1. A turbo-fan engine after-burning system for controlling the flow of after-burned exhaust gas from a turbo-fan engine, comprising:

an after-burning chamber for receiving exhaust gas and injecting a controllable amount of fuel into said turbo-fan exhaust to cause after burning of said turbo-fan exhaust to produce after-burned exhaust;

a nozzle associated with said after-burning chamber for receiving said after-burned exhaust, said nozzle having a fixed geometry including a throat area;

a nozzle coefficient control comprising a compressed gas flow mechanism for controlling the approach of said after-burned exhaust through said nozzle to change the nozzle coefficient of said nozzle by virtue of the presence of said compressed gas by effectively varying said nozzle throat area without mechanical changes to said nozzle geometry and, thereby, control the volumetric flow rate of said after-burned exhaust through said nozzle to improve engine after-burn thrust efficiency.

2. The system of claim 1, wherein said nozzle coefficient control mechanism comprises fluidic control for directing compressed air in the path of said after-burned exhaust for controllably adjusting the nozzle coefficient.

3. The system of claim 1, wherein said nozzle coefficient control mechanism comprises a diaphragm mechanism for inflating and presenting from the inflation a change in the nozzle coefficient for controllably adjusting flow of said after-burned exhaust from said after-burning augmenter system.

4. The system of claim 1, further comprising control circuitry for controlling said nozzle coefficient control mechanism in response to changes in the pressure of said after-burning augmenter chamber.

5. The system of claim 1, wherein said turbo-fan engine exhaust aperture conforms to the airframe of an aircraft for minimizing the radar signature of said aircraft due to operation of said after-burning turbo-fan engine.

6. The system of claim 1, wherein said nozzle conforms within an airframe contour for minimizing infrared signatures of said aircraft due to said after-burning turbo-fan engine.

7. A method for controlling an after-burning turbo-fan engine, comprising the steps of:

producing turbo-fan exhaust and turbo-fan power from a turbo-fan engine;

receiving the turbo-fan exhaust in an after-burning chamber and injecting a controllable amount of fuel into the turbo-fan exhaust to cause after burning of the turbo-fan exhaust to produce after-burned exhaust;

receiving the after-burned exhaust in a nozzle associated with the after-burning chamber, the nozzle having a fixed geometry including a throat area;

controlling the approach of the after-burned exhaust through the nozzle using a nozzle coefficient control mechanism comprising a compressed gas flow mechanism for changing the nozzle coefficient of the nozzle by virtue of the presence of said compressed gas by effectively varying said nozzle throat area without mechanical changes to said nozzle geometry and, thereby, control the volumetric flow rate of said after-burned exhaust through said nozzle to improve engine after-burn thrust efficiency.

8. The method of claim 7, further comprising the step of directing compressed air in the path of the after-burned exhaust using a fluidic control mechanism for controllably adjusting the nozzle coefficient.

9. The system of claim 7, further comprising the step for controllably adjusting flow of the after-burned exhaust from the after-burning augmenter system using a diaphragm mechanism for inflating and presenting from the inflation a change in the nozzle flow coefficient.

10. The method of claim 7, further comprising the step of controlling the nozzle coefficient control mechanism in response to changes in the pressure of the after-burning chamber.

11. The method of claim 7, further comprising the step of conforming the turbo-fan engine system to the airframe of an aircraft for minimizing the radar signature of said aircraft.

12. The method of claim 7, further comprising the step of forming the nozzle within an airframe contour for minimizing infrared signatures of said aircraft.

13. An after-burning turbo-fan engine system, comprising:

a turbo-fan engine for producing a turbo-fan exhaust and turbo-fan power therefrom;

an after-burning chamber for receiving said turbo-fan exhaust and injecting a controllable amount of fuel into said turbo-fan exhaust to cause after burning of said turbo-fan exhaust to produce after-burned exhaust;

a nozzle associated with said after-burning chamber for receiving said after-burned exhaust, said nozzle having a fixed geometry including a throat area;

a nozzle coefficient control mechanism comprising a compressed gas flow mechanism for controlling the approach of said after-burned exhaust through said nozzle to change the nozzle coefficient of said nozzle by virtue of the presence of said compressed gas by effectively varying said nozzle throat area without mechanical changes to said nozzle geometry and, thereby, control the volumetric flow rate of said after-burned exhaust through said nozzle to improve engine after-burn thrust efficiency.

14. The system of claim 13, wherein said nozzle coefficient control mechanism comprises fluidic control for directing compressed air in the path of said after-burned exhaust for controllably adjusting the nozzle coefficient.

15. The system of claim 13, wherein said nozzle coefficient control mechanism comprises a diaphragm mechanism for inflating and presenting from the inflation a change in the nozzle coefficient for controllably adjusting flow of said after-burned exhaust from said after-burning augmenter system.

16. The system of claim 13, further comprising control circuitry for controlling said nozzle coefficient control mechanism in response to changes in the pressure of said after-burning augmenter chamber.

17. The system of claim 13, wherein said turbo-fan engine conform to the airframe of an aircraft for minimizing the radar signature of said aircraft due to operation of said after-burning turbo-fan engine.

18. The system of claim 13, wherein said nozzle forms within an airframe contour for minimizing infrared signatures of said aircraft due to said after-burning turbo-fan engine.

* * * * *